United States Patent [19]
Shapiro

[11] Patent Number: 5,063,585
[45] Date of Patent: Nov. 5, 1991

[54] TELEPHONE SUBSCRIBER LINE FAULT DETECTOR

[75] Inventor: Roy A. Shapiro, Montclair, N.J.

[73] Assignee: AT&T Bell Laboratories, Murray Hill, N.J.

[21] Appl. No.: 589,286

[22] Filed: Sep. 27, 1990

[51] Int. Cl.[5] ............................................. H01M 1/24
[52] U.S. Cl. .......................................... 379/30; 379/27
[58] Field of Search ....................... 379/26, 24, 27, 30, 379/32

[56] References Cited

U.S. PATENT DOCUMENTS 4,292,480  9/1981  Sweatt ..................................... 379/30
4,845,737  7/1989  Ohlendorf et al. ..................... 379/30

Primary Examiner—Stafford D. Schreyer
Attorney, Agent, or Firm—Eli Weiss

[57] ABSTRACT

The present invention relates to a method for distinguishing between an open conductor and a proper termination of a telephone subscriber loop which is terminated with a telephone which does not conform to the ringer-equivalence standard of the FCC Rules. In this invention a telephone subscriber loop can be tested for an open or for a termination by a customer provided equipment telephone by obtaining a first ratio of the tip-to-ground impedance relative to the tip-to-ring impedance; and a second ratio of the ring-to-ground impedance relative to the tip-to-ring impedance, and comparing each of these ratios relative to a fixed ratio value. If the measured ratios are substantially equal to or greater than the fixed ratio value, the subscriber loop is terminated with a customer provided equipment telephone. The fixed value may be dependent upon the length of the loop and whether or not a maintenance termination unit is present in the loop.

8 Claims, 2 Drawing Sheets

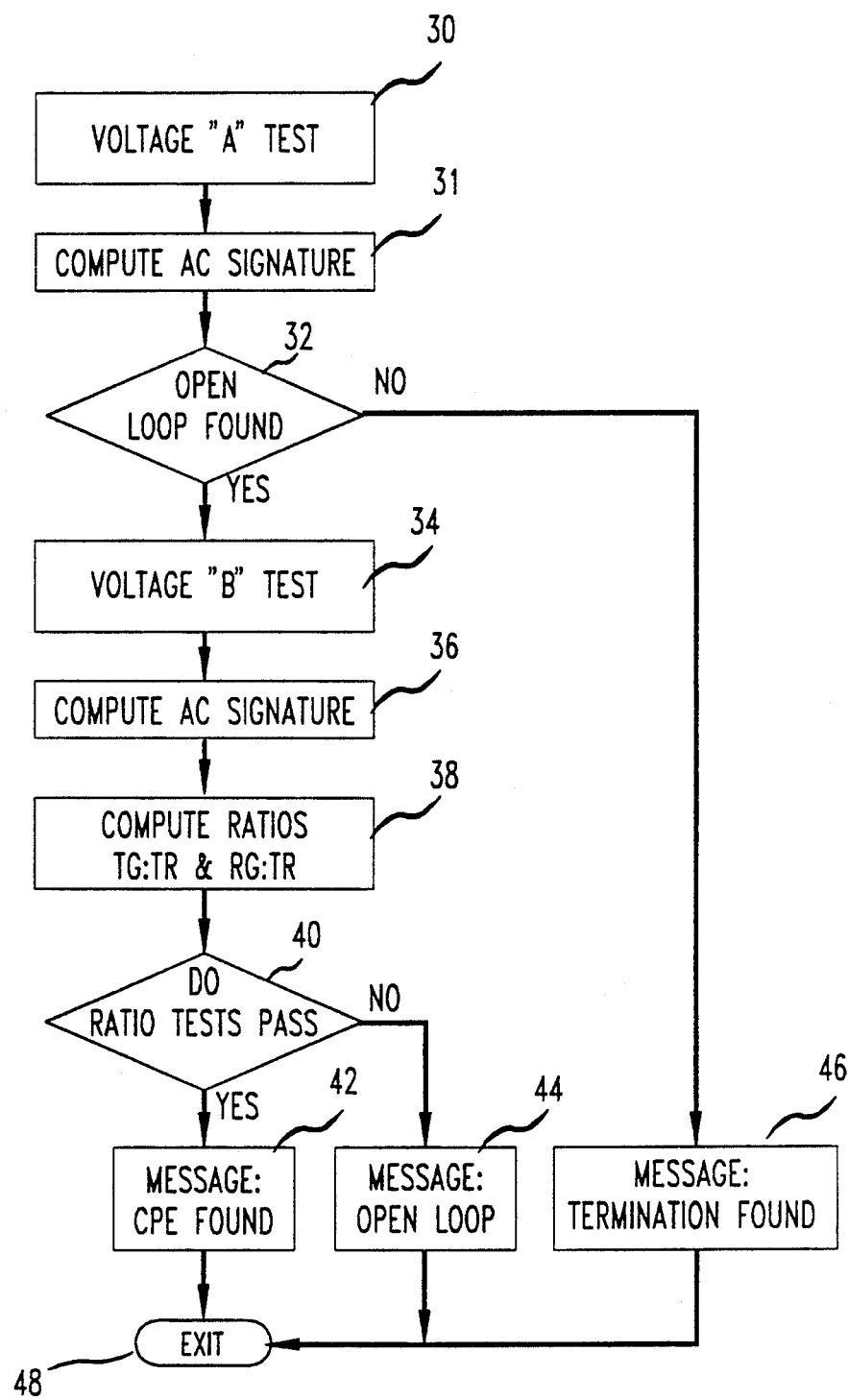

TELEPHONE SUBSCRIBER LINE FAULT DETECTOR

TECHNICAL FIELD

This invention relates generally to a method for testing a telephone subscriber line and more particularly to a method for testing a telephone subscriber line for an open conductor.

BACKGROUND OF THE INVENTION

Over the past several years there has been a large growth in the number of different types of telephones which are purchased by telephone customers for use in their homes and offices. These phones, because they are purchased by the telephone user, are normally identified as being Customer Provided Equipment (CPE) telephones.

These CPE telephones are required to meet a ringer-equivalence standard as specified in Part 68 of the FCC Rules. The purpose of the ringer-equivalence standard is to provide a termination at the end of a subscriber loop that will enable telephone repair personnel to distinguish between an open conductor condition of a subscriber loop and a properly terminated subscriber loop. The ability to make this distinction can prevent an unnecessary dispatch of a repair person.

More specifically, a subscriber loop which has no faults and which is terminated with a telephone which meets the FCC rules will have a specific ac impedance. The absence of this specific ac impedance strongly suggests that one or both of the conductors, the tip conductor or the ring conductor of the subscriber loop has an open condition. Clearly, the ability to accurately detect the presence of a telephone at the end of a subscriber loop is necessary when a subscriber's loop is terminated with a CPE telephone.

It is estimated that approximately 1.4 million of the telephones in use today have ringer-like terminations that do not conform to the ringer-equivalence standard of the FCC Rules and are not currently detectable by existing test methods. Because of the proliferation of undetectable CPE telephones, telephone companies must manually screen customer trouble reports that indicate an open loop condition. This screening usually includes attempts to call the subscriber to help isolate customer provided equipment type of trouble reports. It is estimated that CPE telephones which do not satisfy the FCC termination Rule causes an unnecessary test expense of approximately 25 million dollars per year. Clearly, a need exists for a method of distinguishing between an open conductor and a properly terminated subscriber loop.

SUMMARY OF THE INVENTION

The present invention relates to a method for distinguishing between an open conductor and a proper termination of a telephone subscriber loop which is terminated with a telephone which does not conform to the ringer-equivalence standard of the FCC Rules. In this invention a telephone subscriber loop can be tested for an open or for a termination with a CPE telephone by obtaining a first ratio of the tip-to-ground impedance relative to the tip-to-ring impedance; and a second ratio of the ring-to-ground impedance relative to the tip-to-ring impedance, and comparing each of these ratios relative to a fixed ratio value. If the measured ratios are substantially equal to or greater than the fixed ratio value, the subscriber loop is terminated with a CPE telephone. The fixed ratio value may be dependent upon the length of the loop and whether or not a maintenance termination unit is present in the loop. A maintenance termination unit is a device used and activated by a test signal to segregate metallic faults between the customer premises side and the network side of the unit.

BRIEF DESCRIPTION OF THE DRAWING

FIG. 3 is a flow chart descriptive of a mode of operation of the invention.

DETAILED DESCRIPTION

The current method of testing subscriber loops for its AC signature analysis has been unsuccessful in detecting a significant number of Customer Provided Equipment (CPE) telephones as well as some telephone equipment which does not conform to recommended signatures for terminations. This has resulted in reports of false opens and subsequent unnecessary dispatches of repair personnel to correct falsely reported troubles. A study of this problem indicates that approximately 1.4% of the 100 million telephones in use today are currently undetectable by test methods being used today by the telephone companies. The invention here disclosed, while it does not completely eliminate the problem, does reduce the error rate by approximately 85%.

Some of the beneficial results obtained by using this invention are: A) Greater dispatch efficiency—it is estimated that false dispatches occur for 50% of the undetectable CPE telephones. With this invention a sizable percentage of CPE telephones can be detected and, therefore, the false dispatch rate can be reduced significantly. B) Improved testing integrity—in the present testing environment the repair person is not confident that a report of an "open" is actually open. With this invention a repair person can be more confident that an "open" report is actually an open. C) Confirmation of repair—presently, when a repair is made on a telephone subscriber loop that is terminated with an undetectable CPE telephone, a test of that same loop after the repair has been made will not confirm that all trouble has been cleared. For example, if the initial fault was a short or a ground, and it was cleared, a retest will indicate an open, and the repair person will continue to look for a nonexistent open fault. Therefore, additional testing time and effort is wasted by the repair person in trying to verify the clearance. With this invention the repair can be verified. D) Substantial Cost Savings—reductions in false dispatches, reduction in manual screening of all open test results, and reduction in testing time which is possible with this invention will result in a total annual savings of approximately 25 million dollars for the various telephone companies in the U.S.A.

Figure 1:
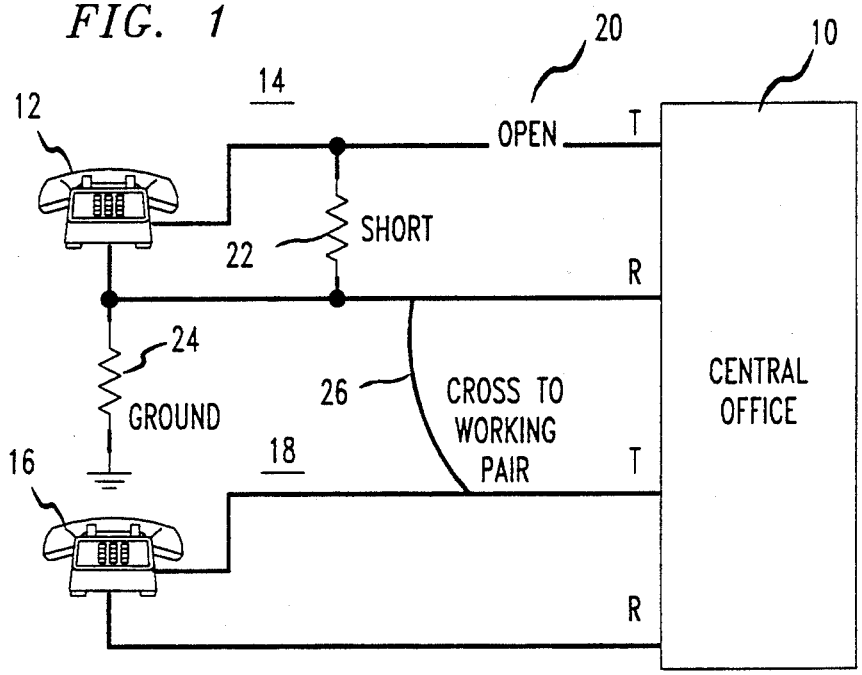
FIG. 1 is a schematic of typical fault conditions which can occur on a subscriber loop.

Referring to FIG. 1, there is illustrated a schematic of typical faults which can occur on a telephone subscriber loop. From a central office 10 a multitude of telephone subscriber loops go to various telephone users. A first loop 14 extends from the central office 10 to a telephone 12 at a subscriber's premises; and, another loop 18 extends from the central office 10 to another telephone 16. Each of the loops consists of a tip conductor and a ring conductor identified as T and R in FIG. 1. Typical faults can be an open 20 in a conductor, a short 22 between the tip T and ring R conductors, or a short to ground 24. Another type of fault or can be an undesired electrical path between loop 14 and loop 18.

Figure 2:
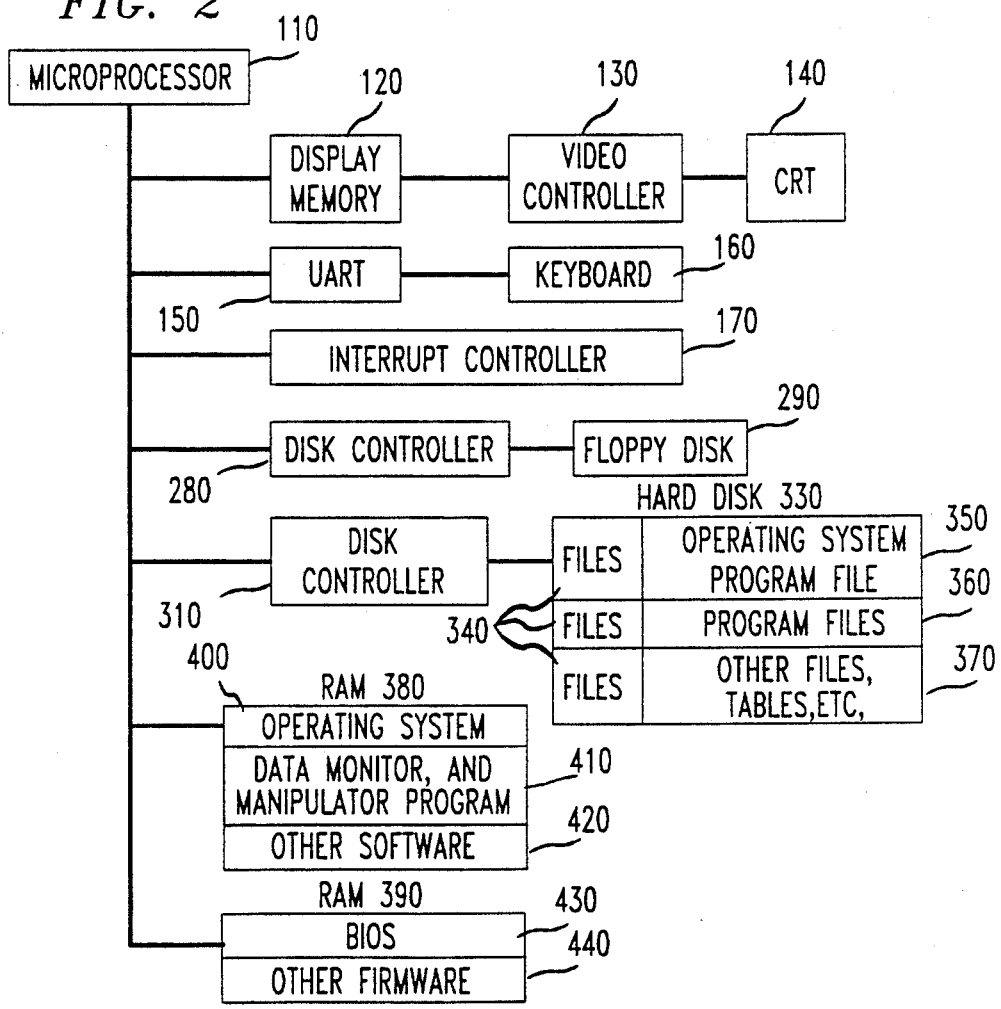
FIG. 2 is a block diagram of structure in accordance with the principle of the invention.

The method of testing a telephone subscriber loop for an open and/or the presence of a CPE telephone is illustrated in FIG. 3. The system for implementing the method of FIG. 3 can be performed manually or with a standard personal computer (PC). Referring to FIG. 2, a PC which can be used is the AT&T Model 6286/EL WGS personal computer, at the heart of which is a microprocessor 110 having address, data and control buses denoted generically as bus 210. Connected to bus 210 are a display memory 120 whose contents are used by a video controller 130 to generate video signals for a CRT 140; a universal asynchronous receiver transmitter (VART) 150, which serves as a serial interface between microprocessor 110 and a keyboard 160; an interrupt controller 170, to which hardware interrupt leads (not shown) extend, inter alia, from VART 150; a floppy disk controller 280, which serves as a interface between microprocessor 110 and a floppy disk memory 290 and a hard disk controller 310, which serves as an interface between microprocessor 110 and hard disk memory 330. The latter hold, inter alia, text files 340; a copy of the workstation's operating system 350 illustratively the UNIX ® operating system; a copy of an application module 360, herein referred to as "program file" which, when executing, performs the various functions and controls the system in accordance with the principles of the invention, and a number of other files not here relevant indicated at 370.

Also connected to bus 210 in random access memory (RAM) 380 and read only memory (ROM) 390. When the system is in operation, RAM 380 holds the executed copies of (a) the operating system, indicated as 400, and (b) data monitor and manipulator program, indicated at 410, and (c) other software not here relevant, indicated as 420. ROM 390 contains the conventional Basis Input-/Output System (BIOS) 430 as well as other firmware 440.

The present invention can utilize hardware and/or software in combination with a personal computer and its peripheral devices (i.e., storage media, peripheral control, video display and the like).

The mode of operation of the invention is accomplished with software which appropriately programs the personal computer.

The flowchart, FIG. 3, is illustrative of a method of testing a telephone subscriber loop for a termination in accordance with the principles of the invention.

Initially, a test of a telephone subscriber loop is made to determine the presence or absence of a termination in order to determine if the subscriber loop is open or not open. In other words, if there is a termination such as a ringer, then the subscriber loop is not open.

A Plain Old Telephone Set (POTS) ringer operates at 20 Hz. The AC signature of the termination is measured with 10 v rms at 24 Hz which is close enough to resonant frequency, yet far enough away so that the signal will not normally ring the customer's telephone set. With 10 V rms applied, the AC test does a quick check for a POTS-like termination. The tip-ring impedance should be between 2K and 20K ohms with tip-ground and ring-ground impedances which are greater than 20K. If this condition is obtained, the message "termination found" is reported. If this condition is not obtained, it can be because the line has DC leakage, it is a ground-start PBX line, the AC impedance is too low, there is other equipment on the line, there is a CPE phone on the line, or the line is open.

In those instances where the test of a telephone subscriber loop shows an open, a test should be made to determine whether or not the loop has a termination such as a CPE telephone. Referring to FIG. 3, when a loop is to be tested, it is disconnected from the telephone network, and this is normally done at the central office. At the central office end of the loop, an AC voltage "A" test 30 is performed. The signal that is applied to the loop is a 10 v rms signal having a frequency of 24 Hz. The signal can have a duration of 0.7 seconds and is applied across the tip-ring, the tip-ground and then the ring-ground paths. This test is the normally used test to determine if a loop has an open. If the test shows that there is no open—32—the testing of the loop for opens can be terminated and the message "TERMINATION FOUND"—46 is generated. If, however, the test does show an open, then the tester must try to determine if the open is an actual open or the CPE telephone was not detected. This is attempted by calling the subscriber.

In accordance with the principles of the invention, an AC voltage "B" test 34 is performed. A 60 V rms 24 Hz potential is applied across the tip-ring path, the tip-ground path and the ring-ground path. From this test, a second AC signature of the loop is determined 36. The AC signature consists of the tip-ring impedance, the tip-ground impedance, the ring-ground impedance and the length of the loop. This test is similar in all respects to the first test, but it is performed at a higher voltage. During the first test, it was determined that the loop was open. Now, the ratios of the results of the second test are determined 38. The ratio of the tip-ground impedance relative to the tip-ring impedance; and the ratio of the ring-ground impedance relative to the tip-ring impedance are determined. Depending upon the length of the loop and whether or not the loop contains a maintenance termination unit, the ratios of the tip-to-ground impedance and the ratio of the ring-to-ground impedance is determined. These values can be 3:1; 4:1; or 6:1. There are test procedures to determine if there is a maintenance termination unit on the line. A ratio of 3:1 is a standard ratio. A loop having a ratio of substantially 3:1 or greater is considered to be terminated with a CPE telephone and a message "CPE FOUND"—42 is generated. The tip-to-ground relative to the tip-to-ring ratio and the ring-to-ground relative to tip-to-ring ratio are determined at 38, and their values examined at 40. Each of the two ratios must be substantially equal to or greater than a fixed value of 3:1 to pass. That is, the loop is terminated with a CPE telephone if the ratios are substantially equal to or greater than 3:1. If either or both of the ratios is less than the fixed value of 3:1, then according to the ratio test the loop is open and a message "OPEN LOOP"—44 is generated. In those instances where the loop includes a maintenance termination unit, the fixed value is 6:1 and the ratio must be equal to or greater than 6:1 to indicate that the loop is terminated with a CPE telephone. In some instances the loop may have a length which is greater than 60K feet. In this instance the fixed value is 4:1 and the ratio must be equal to or greater than 4:1 to indicate that the loop is terminated with a CPE telephone.

Restating the inventive departure here disclosed, a telephone subscriber loop can be tested for an open or for a termination with a CPE telephone by obtaining a first ratio of the tip-to-ground impedance relative to the tip-to-ring impedance; and a second ratio of the ring-to-ground impedance relative to the tip-to-ring impedance and comparing each of these ratios with a fixed ratio value. If the measured ratios are substantially equal to or greater than the fixed ratio value, the subscriber loop is terminated with a CPE telephone. The fixed value may be dependent upon the length of the loop and whether or not a maintenance termination unit is present in the loop.

I claim:

1. A method of testing a telephone subscriber loop having a tip conductor and a ring conductor for a customer provided equipment telephone termination comprising the steps of
   measuring the impedance between the tip conductor and a ground terminal,
   measuring the impedance between the ring conductor and the ground terminal,
   measuring the impedance between the tip conductor and the ring conductor,
   comparing the tip-ground impedance and ring-ground impedance with the tip-to-ring impedance to obtain two ratio values; and
   comparing said two ratio values with a fixed ratio value to determine the presence of a customer provided equipment telephone termination on said telephone subscriber loop.

2. The method of claim 1 further
   comprising the step of
   determining the length of said telephone subscriber loop to determine said fixed ratio value.

3. The method of claim 2 further comprising the step of determining if said telephone subscriber loop has a maintenance termination unit for determining the fixed ratio value.

4. The method of claim 1 further
   comprising the step of
   comparing said two ratio values with a fixed ratio value of substantially 3:1, and
   identifying a telephone subscriber loop as having a customer provided equipment telephone termination when said two ratio values are substantially equal to or more than said fixed ratio value.

5. The method of claim 1 further
   comprising the step of
   comparing said two ratio values with a fixed ratio value of substantially 4:1, and
   identifying a telephone subscriber loop as having a customer provided equipment termination when said two ratio values are substantially equal to or more than said fixed ratio value.

6. The method of claim 1 further
   comprising the step of
   comparing said two ratio values with a fixed ratio value of substantially 6:1, and
   identifying a telephone subscriber loop as having a customer provided equipment termination when said two ratio values are substantially equal to or more than said fixed ratio value.

7. The method of claim 5 wherein
   said loop is substantially equal to or greater than 60K feet.

8. The method of claim 6 wherein
   said loop includes a maintenance termination unit.

* * * * *